Figure 1:
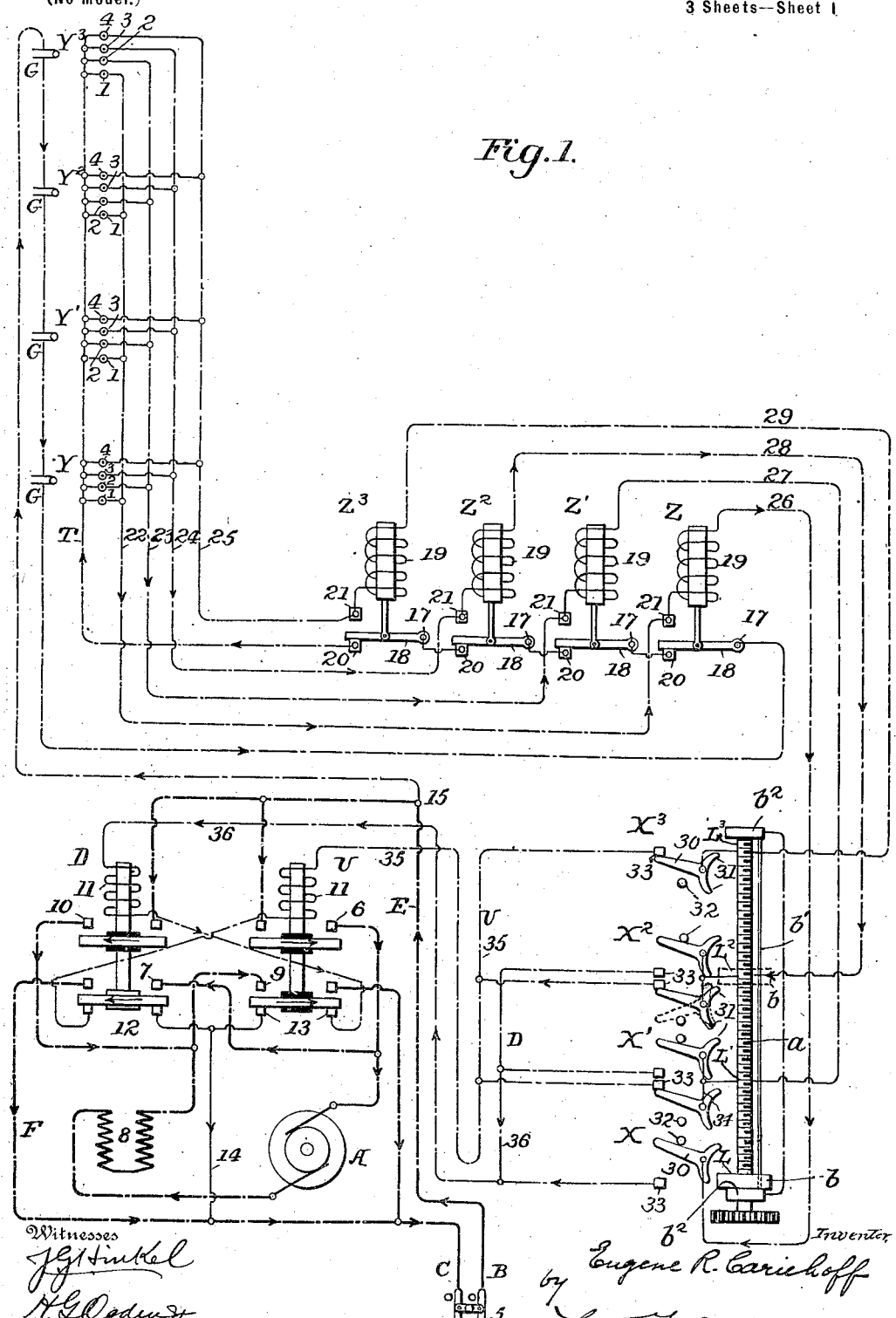

No. 677,891. Patented July 9, 1901.
E. R. CARICHOFF.
CONTROLLING APPARATUS FOR ELEVATORS.
(Application filed Oct. 5, 1900.)
(No Model.) 3 Sheets—Sheet 1.

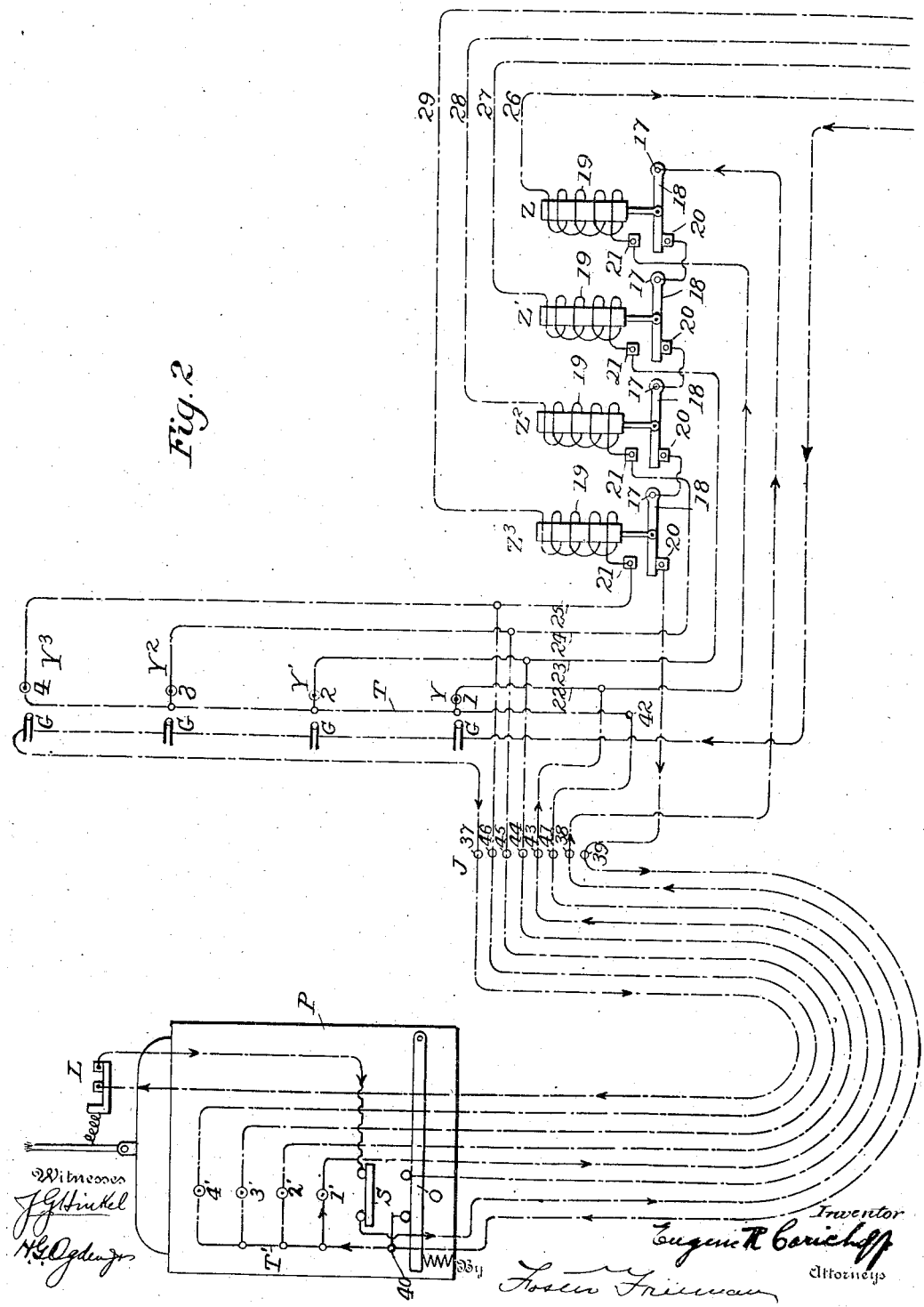

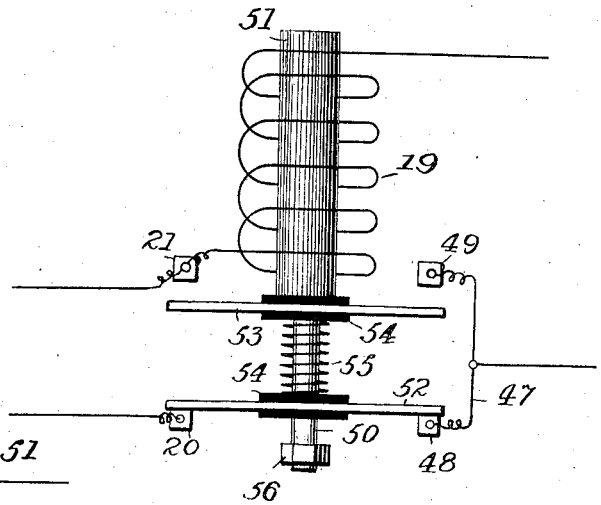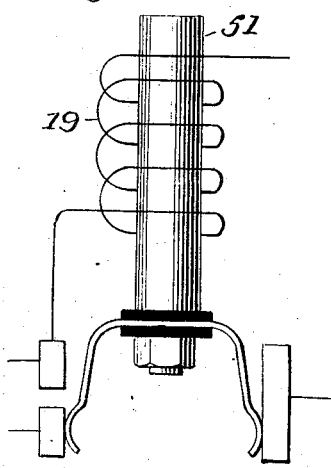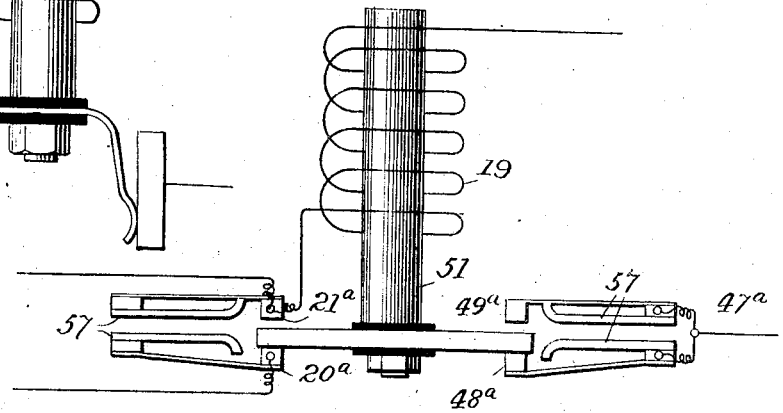

UNITED STATES PATENT OFFICE.

EUGENE R. CARICHOFF, OF EAST ORANGE, NEW JERSEY, ASSIGNOR TO THE OTIS ELEVATOR COMPANY, OF SAME PLACE.

CONTROLLING APPARATUS FOR ELEVATORS.

SPECIFICATION forming part of Letters Patent No. 677,891, dated July 9, 1901.

Application filed October 5, 1900. Serial No. 32,150. (No model.)

*To all whom it may concern:*

Be it known that I, EUGENE R. CARICHOFF, a citizen of the United States, residing at East Orange, in the county of Essex and State of New Jersey, have invented certain new and useful Improvements in Controlling Apparatus for Elevators, of which the following is a specification.

My invention relates to certain improvements in the apparatus described and claimed by me in an application, Serial No. 688,182, filed August 1, 1898, for an elevator-controller. In that case a system of electrical control for elevators was so arranged that the closing of a switch at any landing caused the elevator-car to travel toward and stop automatically at that landing. Switches corresponding to the several landings were also located within the car, and these were so connected that the closing of a switch corresponding to a given landing also caused the car to travel toward and automatically stop at that landing. In carrying out these features the apparatus was so arranged that upon the closure of the controlling-circuit at a car-switch or at any landing-switch the remaining switches at the several landings were simultaneously locked open, so that no conflicting circuit could be established at another point. The circuit from each landing-switch was completed through the up or down controlling-circuit, including a relay, according as the car was required to be brought up or down to the landing at which the switch was located. In my present application the apparatus is so arranged that upon the closure of the controlling-circuit at a landing-switch the car will travel toward and automatically stop at the landing corresponding to that switch, while all the rest of the landing-switches, together with the one operated, will be automatically cut out of circuit, so that no conflicting circuits can be made. Switches corresponding to the landings may also be located upon the car, and the closure on the car of the controlling-circuit will then automatically cut out all of the car-switches. Where both landing and car switches are used, two additional switches are placed upon the car, one arranged to automatically cut out all of the landing-switches whenever the operator enters the car, thus preventing conflicting circuits from the landings, and another to allow the operator to break the controlling-circuit at will, so that the car is always under his control. There may be one or a plurality of switches at each floor, a plurality at one floor and one at each of the other floors, or a plurality of switches at the lower floor only, as in the case of dumb-waiters, where it is only necessary to direct the car from the lower floor to different elevations and call it back. In any case these landings or floors may be stations of different kinds for calling the car not only to the station, but for sending it up or down to other stations.

The controlling-circuit includes in series door-switches adapted to be closed by the elevator-doors and one side of each of a set of automatic circuit-controlling switches actuated by electroresponsive devices, and, according to the particular landing or car switch closed, it includes in series with these one landing or car switch, a contact of one automatic controlling-switch including its actuating electroresponsive device, a floor limit-switch for stopping the car at the desired floor, and an up and down starter or relay for the elevator-motor. The landing-switches are connected in parallel to a common conductor and by individual conductors to contacts of the automatic controlling-switches, while the car-switches are connected in parallel to the landing-switches.

When a landing or car switch is closed, the controlling-circuit is first completed through the circuit just described, including one electroresponsive device which acts to shift its circuit-controlling switch, thereby cutting out all of the landing or car switches, but at the same time short-circuiting the electroresponsive device upon the source of supply through a floor limit-switch and an up and down starter or relay, thus maintaining a circuit through the relay until the mechanism connected with the car or motor breaks the circuit at the limit-switch corresponding to the required landing, which stops the car, there being no circuit through any other limit-switch at the same time, although they may be closed.

The floor limit-switches are so arranged that the car may be called to a given floor no matter whether it be above or below that floor, and they may be arranged in a well adjacent to the floors or in connection with any traveling part of the mechanism, so as to be actuated as the part of the mechanism traveling in unison with the car reaches different positions. There may be two limit-switches for each station, which permits each switch to be so set as to be operated before the car actually reaches the station corresponding to each switch, so as to compensate for its momentum.

In the drawings, Figure 1 is a diagram showing the connections as applied more particularly to dumb-waiters. Fig. 2 is a diagram of a system of elevator-car control, and Figs. 3, 4, and 5 are elevations showing modifications of the controlling-switch.

The connections of Fig. 1 are particularly applicable to a dumb-waiter where a plurality of switches or buttons at the first floor only are necessary; but I have shown a plurality of buttons 1 2 3 4 at each floor or station $Y Y' Y^2 Y^3$.

All circuits lead through contacts controlled by two relays—an up relay U, which is operated when the car is ascending, and a down relay D, which is operated when the car is descending—the relays determining the direction of the current through the armature of the motor according to the direction in which the car is to travel. The apparatus may be provided with a motor of any suitable character, but, as in my former application above referred to, an electric motor A is shown which, together with all the circuits, receives current from mains B C through a main switch 5 and which operates a cage or platform or car upon a route provided with different stations $Y Y' Y^2 Y^3$, which stations may be landings at the different floors of a building. There are leads from both mains B and C to each relay. A wire from one brush of the motor is connected to a contact 6, through which it will be closed to lead E, and thus to the positive main B, when the up relay is energized. A branch from the same brush is connected with a contact 7, through which it will be closed to lead F, and thus to the negative main C, when the down relay is energized. From the other brush of the motor the circuit is through a starting resistance 8, from which it branches to two contacts, one of which, 9, is closed to lead F when the up relay is energized, and the other of which, 10, is closed to lead E when the down relay is energized. These connections constitute, respectively, the up and down circuits of the motor-armature. It will therefore be seen that the energizing of either relay will connect the armature of the motor through the starting resistance to the source of supply, one relay connecting the armature to the source of supply in the opposite direction from the other.

The circuit of each relay-solenoid 11 is through one of the contacts 12 13, that of the up-relay solenoid being through contacts 12, which are controlled by the down relay, and that of the down-relay solenoid being through contacts 13, which are controlled by the up relay, each being open when its controlling-relay is energized. This arrangement prevents one relay from being energized if the other is energized or the simultaneous operation of both relays. From contacts 12 13 connection is made to lead F through a connection 14 and thence to the negative main C. The controlling-circuit to the stations is arranged in parallel to the armature-circuit, branching at 15 from lead E and passing through door-switches G at each station adapted to be closed by the doors, so that the controlling-circuit cannot be made unless all the doors are shut. From door-switch G of landing Y connection is made directly with terminals 17 of switch I of a set of automatic circuit-controlling switches $Z Z' Z^2 Z^3$, of which there are as many as there are stations and which are connected to be operated by the buttons 1 2 3 4 at the stations $Y Y' Y^2 Y^3$. These circuit-controlling switches may consist of contact-pieces 18, pivoted at their terminals 17 and mechanically connected to be shifted by electroresponsive devices of any suitable character, I having shown solenoids 19, with cores attached to the contact-pieces 18. A solenoid when energized will shift a contact-piece 18 from its normal position upon contact 20 to and against contact 21. Each contact 20 is electrically connected with terminal 17 of the adjacent switch, so that with all the contact-pieces 18 in their normal positions there will be a continuous circuit through the switches from Z to $Z^3$.

To contact 20 of controlling-switch $Z^3$ is connected a common conductor T on one side of each of the buttons 1 2 3 4 at the stations. The other sides of the buttons are connected, respectively, to individual conductors 22, 23, 24, and 25, which connect with contacts 21 of the controlling-switches, the conductor 22 leading to switch Z, conductor 23 to switch Z', conductor 24 to switch $Z^2$, and conductor 25 to switch $Z^3$. Therefore all the buttons 1 are connected to switch Z, all the buttons 2 to switch Z', &c. One terminal of each solenoid 19 is connected to contact 21 of the switch it controls, the other ends of the solenoids being connected, respectively, by means of wires 26, 27, 28, and 29 to floor or station limit switches $X X' X^2 X^3$, one for each floor or station, presently to be described. From the limit-switches connections are made to the actuating-solenoids 11 of the up or down relays U or D, and thence, as before described, to the negative main C. It will thus be seen that while all the buttons 1 2 3 4 at the stations are in parallel with each other from a common conductor T, upon pressing any one button a circuit will be completed through a solenoid 19, which immediately shifts one of the contact-pieces 18 from its contact 20 to its contact 21, thus cutting out all of the buttons, including the one pressed, by breaking the only path to them through the circuit-controlling switches Z Z' Z² Z³. At the same time the solenoid itself is included in a short circuit, and it will maintain this part of the controlling-circuit closed until broken at a floor limit-switch.

The form of automatic circuit-controlling switch shown in Fig. 3 is preferable to that shown in Fig. 1, since the connections for short-circuiting a solenoid should be made before the station-buttons are cut out.

The floor limit-switches X X' X² X³ may be of any suitable character for accomplishing the desired purpose; but, as shown, these limit-switches consist of pivoted contact-arms 30, with shoulders 31, adapted to be hit by a traveling nut $b$ on a screw $a$, rotated by suitable connection with the elevator-motor, the travel of the nut and distance between switches being proportioned to the distance between floors, if the switches are not at the floors themselves. This nut $b$ is guided by the rod $b'$, extending between the brackets $b^2$, supporting the rod $a$. Any other equivalent means may be used for operating the floor-limit switches. Stops 32 control the throw of the contact-arms 30, which make contact with their respective contact-pieces 33, which are connected to the up and down relay wires 35 and 36. There is only a single limit-switch for the first floor, its contact-piece 33 connecting with the down relay, since at the first floor the car or dumb-waiter will then always be called down by pressing floor-switch 1, while there is also a single switch only for the top floor, its contact-piece 33 connecting with the up relay, since at this floor the car or waiter will only be called up by pressing button 4 at that floor. The limit-switches for the intermediate floors are made double, the contact-arms being electrically connected by a bar 34 with connections from the contact-arms of these switches to the up and down relays through wires 35 and 36. All of the limit-switches are also so arranged that when the car or dumb-waiter rises each switch connecting with the up relay U is broken and the switches set to connect with the down relay D, while upon the car descending the switch connections with the down relay are broken and those with the up relay made.

As hereinbefore stated, the travel of the nut $b$ is proportional to the travel of the car, and since the screw is rotated by suitable connections with the motor the nut $b$ will continue its travel as long as the car is moving and come to rest when the car does.

L L' L² L³ denote the positions of the nut $b$ at rest corresponding to the positions of the car as it stops at the stations Y Y' Y² Y³, respectively. Should the car be called upward to station Y², for instance, and there stopped, the nut, as shown in dotted lines, would come to rest at L²; but just before the car and nut come to rest the circuit has been broken by the nut at the lower contact-arm of X², which is left in the dotted position. The same operation would be repeated for any switch X, so that, in any case, to compensate for the car's momentum the controlling-circuit is broken shortly before the car reaches its desired destination.

In the diagram Fig. 1 the nut $b$ is supposed to have moved downward to the first-floor limit-switch. In its descent it has left the limit-switches open to the down relay, but closed to the up relay. Suppose it is desired to send the dumb-waiter from station Y to station Y² and call it back again. All the elevator-doors must be shut to close switches G. The contact-pieces 18 of the automatic controlling-switches will be in their normal positions upon contacts 20, and the station limit-switches will be so set that the circuit can only be completed to the up relay. Button 3 at station Y should then be pushed, in which case there will be a circuit completed as follows: From the point 15 on lead E, through door-switches G to terminal 17 of controlling-switch Z, through the controlling-switches to contact 20 of switch Z³ to common conductor T, button 3 of station Y, individual conductor 24 to contact 21 of switch Z², through its solenoid 19 to wire 28, through lower arm of limit-switch X² to wire 35 to solenoid 11 of up relay U, contact 12 of down relay D and to lead F by wire 14. Solenoid 19 of controlling-switch Z² will therefore be energized, shifting contact-piece 18 from contact 20 to contact 21, which breaks the circuit to the station-buttons and includes the solenoid in a short circuit. Relay U has started the motor to send the car up. The nut $b$ will consequently travel upward until it comes to the lower arm of limit-switch X², corresponding to station Y², where it breaks the controlling-circuit and the car is stopped. To call the car back to station Y, button 1 at station Y is pressed, when it will be seen that controlling-switch Z will be operated and the down relay D, while the nut $b$ will finally break the circuit at limit-switch X, stopping the car at station Y.

In the complete system of car control shown in diagram in Fig. 2, in addition to the apparatus of Fig. 1, I add a set of circuit closers or buttons 1' 2' 3' 4' on the car P, corresponding to the stations and connected to operate the circuit-controlling switches Z Z' Z² Z³, but arranged in parallel to the circuit closers or buttons at the stations, so that they operate in the same manner to start the car; but in this case I provide two additional switches in the car—one for the purpose of stopping the car whenever desired by breaking the circuit and the other for the purpose of rendering the buttons at the various stations inoperative, so that no one at the stations can operate the car when the operator is in the car.

In Fig. 2 the controlling-circuit after passing through the door-switches G instead of passing to controlling-switch Z is first led to the car P. Connection is therefore made between door-switch G of station Y³ and junction 37 of a junction-box J, from which flexible-cable conductor conveys the current to a slack-cable switch. From thence connection is made to a stop-switch S on the car P, which switch on being opened will break the controlling-circuit and stop the car at any desired point. From the stop-switch connection is made by flexible cable with the junction-box J at 38 and from thence by wire direct to terminal 17 of controlling-switch Z.

Any well-known means may be used to operate the cut-out switch O, and I have indicated a movable portion of the floor as being connected to the switch to operate it when the passenger steps on the floor.

Instead of a direct connection between terminal 20 of switch Z³ and the common conductor T the controlling-circuit passes to the junction-box J at 39, thence by flexible cable to the car P at 40, from which point the circuit is divided, one branch leading to the common conductor T' for the car-buttons 1' 2' 3' 4' and another branch leading to a cut-out O, which is automatically opened upon the operator entering the car and remains open as long as he is in the car. Since the only connection between the common conductor T at the stations Y Y' Y² Y³ and the source of supply is from the cut-out O by flexible cable to the junction-box at 41 and thence to common conductor T at 42, it follows that as long as cut-out O is open no station-button can be operated. From the buttons 1' 2' 3' 4' on the car connections are made by flexible cables to the junction-box at 43 44 45 46, respectively, and thence to individual conductors 22, 23, 24, and 25, respectively, cutting in on these conductors at points between the station-buttons and the automatic controlling-switches Z Z' Z² Z³. Let it be supposed that the operator has entered the car, thus opening cut-out O and rendering all the station-buttons inoperative, (switch S is presumed to be closed,) and let it be supposed that the operator presses button 1' on the car, desiring to go from any other landing to the first floor or station Y. A circuit will then be completed, as follows: from the door-switches G to junction-box J at 37, by flexible-cable conductor to slack-cable switch L, to stop-switch S, by flexible cable, to the junction-box at 38, to terminal 17 of controlling-switch Z, through the controlling-switches to contact 20 of switch Z³, to the junction-box at 39, by flexible cable to button 1' on the car, and returns by flexible cable to the junction-box at 43 to conductor 22, to contact 21 of switch Z, and through its solenoid 19 to wire 26, to limit-switch X, to down relay D, through wire 36, and out. The car-switches are all cut out by the shifting of the automatic controlling-switch at Z, its solenoid being also short-circuited, while unless the controlling-circuit is broken at S before the car arrives at station Y it will proceed to station Y, where it will be stopped by the breaking of the controlling-circuit at limit-switch X.

In Fig. 3, 19 represents the solenoid of an automatic controlling-switch, as before, connected at one end to its contact 21. The wire from the door-switches G is connected to a bar or wire 47, joining two contacts 48 and 49. To the lower reduced end 50 of the core 51 are loosely connected contact-pieces 52 and 53, insulated from the bore by washers and mechanically connected to each other by a spring 55. The contact-pieces therefore have a limited vertical play upon the reduced end 50 and relative to each other. A stop 56 is fastened to the end of the reduced portion 50, so that in the normal position of the switch with contact-piece 52 bridging contacts 20 and 48 there is a space between the contact-piece and the stop, and spring 55 is held under such compression by the weight of the whole core 51 pressing upon contact-piece 53 that contacts 21 and 49 are not bridged. It will readily be seen that upon the solenoid being energized and its core attracted upward the tension upon the spring will be released, which upon expanding will allow contact-piece 53 to bridge contacts 21 and 49 before the contact-piece 52 is raised from the contacts 20 and 48 by stop 56.

It will be understood that any desired kind of motor and connection may be used, and I have indicated a conventional arrangement of motor-circuit for clearness of description.

It will thus be seen that I provide a simple arrangement of circuits, including up and down starting relays, station limit-switches, to be operated from some moving portion of the elevator, apparatus to control the up and down starting relays or magnets, and a number of automatic controlling-switches, one for each station, and the parts are so constructed and arranged that they can be operated from any station or from the car to cause the elevator to approach and stop at any station and there can be no interference with its operation from any other station, as the push-buttons of all the other stations, as well as the one operated, are cut out, while the circuit is maintained through the controlling-switch and the station limit-switch of the button operated and through the relays until the car reaches the desired destination.

In Fig. 4, 19 represents the solenoid of an automatic controlling-switch, one end of the solenoid being connected to a spring-contact 21ᵃ, to which contact one of the wires from the landing-switches is also connected. The wire from the door-switches G is connected to a bar or wire 47ᵃ, electrically connecting two spring-contacts 48ᵃ and 49ᵃ, while spring-contact 20ᵃ is electrically connected to the adjacent controlling-switch. 57 represents stops limiting the movement of the spring-contacts. The core 51 of solenoid 19 carries a contact-piece 58, which is shown in Fig. 4 as bridging contacts 20ᵃ and 48ᵃ, the weight of the core keep ing the contact-piece away from contacts 21ª and 49ª and below the lower stop 57. Upon solenoid 19 becoming energized core 51 is lifted and stops 57 are so adjusted that contact-piece 58 bridges the upper spring-contacts 21ª and 49ª before it is raised from the lower contacts.

As the function of the automatic controlling-switch is to maintain the circuit established by any button and to cut out the common circuit to all the buttons, this may be accomplished in other ways—as, for example, by a brush or spring attached to core of solenoid and sliding from one set of connections to the other, as shown in Fig. 5.

What I claim is—

1. In a controlling apparatus for elevators, the combination with the motor, of relays controlling the operation of said motor, station limit-switches, and means for operating them from some moving part of the apparatus, the switches being arranged to break the circuits before the car reaches the desired station, substantially as described.

2. In a controlling apparatus for elevators, the combination with the motor, of relays controlling the operation of said motor, station limit-switches, and means for operating them from some moving part of the apparatus, the switches comprising two contacts and arms, one for closing the contacts as the car ascends and the other as the car descends, substantially as described.

3. In a controlling apparatus for elevators, the combination with the motor, of relays controlling the operation of said motor, station limit-switches, and automatic circuit-controlling switches controlling the circuits to the station limit-switches, substantially as described.

4. In a controlling apparatus for elevators, the combination with the motor, of relays controlling the operation of said motor, station limit-switches, and automatic controlling-switches, comprising a solenoid, two contacts and a contact-piece, substantially as described.

5. In a controlling apparatus for elevators, the combination with the motor, of relays controlling the operation of said motor, station limit-switches, automatic controlling-switches connected to the station limit-switches, and a circuit for each controlling-switch including one or more push-buttons, whereby when a push-button is operated, all the push-buttons are cut out of a circuit while the circuit is maintained through the automatic controlling-switch, the station limit-switch and relay, substantially as described.

6. In a controlling apparatus for elevators, the combination with the motor of relays controlling the operation of said motor, station limit-switches, automatic controlling-switches, a series of push-buttons, a common conductor from the push-buttons to the automatic controlling-switches, and an individual conductor from the push-buttons from each station to an automatic controlling-switch, substantially as described.

7. In a controlling apparatus for elevators, the combination with the motor, of relays controlling the operation of said motor, station limit-switches, a series of automatic controlling-switches connected to the station limit-switches, each switch having two contacts, a series of push-buttons, a common conductor from the push-buttons normally including one contact of each controlling-switch, and an individual conductor from the push-buttons of each station including a contact of a controlling-switch, substantially as described.

8. In a controlling apparatus for elevators, the combination with the motor, of relays controlling the operation of said motor, station limit-switches, a series of automatic controlling-switches, each having two contacts, a series of push-buttons, a common conductor from the push-buttons normally including a contact of each controlling-switch in series, and an individual conductor from the push-buttons of each station to a contact of a controlling-switch, substantially as described.

9. In a controlling apparatus for elevators, the combination with the motor, of relays controlling the operation of said motor, station limit-switches, a series of automatic controlling-switches each having two contacts and a contact-bar, and means for controlling the contacts, a series of push-buttons, a common conductor from the push-buttons including one of the contacts of each controlling-switch, and an individual conductor from the push-buttons of each station to a contact of a controlling-switch and including the means for controlling the contacts, substantially as described.

10. In a controlling apparatus for elevators, the combination with the motor, of relays controlling the operation of said motor, station limit-switches, a series of automatic controlling-switches, each comprising two contacts, a contact-bar and a solenoid, a series of push-buttons, a common conductor from the push-buttons to the automatic controlling-switches, and an individual conductor from the push-button of each station to a contact of the controlling-switches, and including the coils of the solenoid of said switch, substantially as described.

11. In a controlling apparatus for elevators, the combination with the motor, of relays controlling the operation of said motor, station limit-switches, automatic controlling-switches, a series of push-buttons for each station, a series of push-buttons on the car, a common conductor between all the push-buttons and the automatic controlling-switches, and individual conductors between each push-button and a controlling-switch, substantially as described.

12. In a controlling apparatus for elevators, the combination with the motor, of relays controlling the operation of said motor, station limit-switches, automatic controlling-switches, a series of push-buttons for each station, a series of push-buttons on the car, a common conductor between all the push-buttons and the controlling-switches, individual conductors from each push-button to a controlling-switch, and a switch in the car for cutting out the push-buttons for the stations, substantially as described.

13. In a controlling apparatus for elevators, the combination with the motor, of relays controlling the operation of said motor, station limit-switches, automatic controlling-switches, a series of push-buttons for the stations, a series of push-buttons in the car, a common conductor between the push-buttons and the controlling-switches, individual conductors for each push-button to a controlling-switch, a switch in the car for cutting out the push-buttons at the stations, and a stop-switch in the car, substantially as described.

In testimony whereof I have signed my name to this specification in the presence of two subscribing witnesses.

EUGENE R. CARICHOFF.

Witnesses:
C. W. MARSHALL,
W. H. BRADY.